United States Patent [19]

Freeman et al.

[11] Patent Number: 5,103,431

[45] Date of Patent: Apr. 7, 1992

[54] APPARATUS FOR DETECTING SONAR SIGNALS EMBEDDED IN NOISE

[75] Inventors: David F. Freeman, Bedford; William J. Fonseca, Mansfield, both of Mass.

[73] Assignee: GTE Government Systems Corporation, Waltham, Mass.

[21] Appl. No.: 636,053

[22] Filed: Dec. 31, 1990

[51] Int. Cl.$^5$ ........................ H04B 1/06; H04B 15/00; H04B 1/10

[52] U.S. Cl. ............................ 367/135; 367/131; 367/901; 395/22

[58] Field of Search .................. 367/131, 135, 901; 364/513

[56] References Cited

U.S. PATENT DOCUMENTS

| | | | |
|---|---|---|---|
| 4,017,859 | 4/1977 | Medwin | 367/901 |
| 4,914,603 | 4/1990 | Wood | 364/513 |
| 4,947,177 | 8/1990 | Fothergill | 367/901 |

*Primary Examiner*—Ian J. Lobo

[57] ABSTRACT

Apparatus for detecting sonar signals embedded in noise includes a neural network trained to detect signals in response to the slope of amplitude rank ordered noise corrected powers. A detector detects an analog waveform. Means samples and digitizes the analog waveform to obtain digital samples which in turn are passed through a cosine window. The digital samples are Fourier transformed into conjugate sets of complex numbers representing amplitude and phase. One conjugate set of the complex numbers are discarded, and the remaining complex numbers ranked according to frequency. The sum of the square of the real and imaginary component of each of the remaining complex numbers in a frequency band are provided to obtain a corresponding series of representing estimated power ranked by frequency over the band. The noise contained in subbands of the band is estimated. Each estimated power is then divided by the estimated noise of the subband containing the estimated power to obtain corresponding noise corrected powers, which are ranked ordered according to amplitude. The amplitude rank ordered noise powers are provided to corresponding inputs of the neural network.

1 Claim, 4 Drawing Sheets $$E_9(j) = \frac{1}{10} \sum_{i=10}^{9} \hat{P}_K(i)$$

FOR k = 10 TO ∞

IF $\hat{P}_K(j) < 1.6 E_{K-1}(j)$

THEN $E_K(j) \Leftarrow E_{K-1}(j) + \frac{1}{40}(\hat{P}_K(j) - E_{K-1}(j))$

ELSE $E_K(j) \Leftarrow E_{K-1}(j) + \frac{1}{400}(\hat{P}_K(j) - E_{K-1}(j))$

FIG. 2

FOR j = 0 TO 16

FOR i = 5j TO 5j+4

$$P_K(i) \leftarrow 2 \frac{P_K(i)}{E_K(i)}$$

FIG. 3

APPARATUS FOR DETECTING SONAR SIGNALS EMBEDDED IN NOISE

RELATED COPENDING APPLICATIONS

The following patent application is related to this:

U.S. Patent application Ser. No. 07/636,047, filed concurrently with this, for Method for Detecting Non-sonar Signals Embedded in Noise;

U.S. Patent application Ser. No. 07/636,304, filed concurrently with this, for Apparatus for Detecting Non-sonar Signals Embedded in Noise;

U.S. Patent application Ser. No. 07/636,539, filed concurrently with this, for Method for Detecting Sonar Signals Embedded in Noise;

U.S. Patent application Ser. No. 07/636,540, filed concurrently with this, for Method of Updating Average Noise during Overlapping Time Periods.

PATENT INCORPORATED BY REFERENCE

U.S. Pat. No. 4,914,603 for TRAINING NEURAL NETWORKS, issued Apr. 3, 1990 by Laurence F. Wood is hereby incorporated by reference.

BACKGROUND OF THE INVENTION

This invention pertains to detection of transient events in noise and more particularly is concerned with preprocessing data in combination with an artificial neural network to decide the presence or absence of a non-periodic signal at a given time.

Artificial neural networks are powerful nonlinear processors, characteristics that make them particularly suitable for decision making applications. Neural networks can be trained by example. For a neural network to be trained to recognize events in class A (signals of interest) and reject events in class B (background noise), it is sufficient to construct training sets of representative examples from Class A and Class B. These training sets are used to adjust the neural network (by means of the selection of values for internal weights for connection between neural network nodes) so that it recognizes the two training sets. Because neural networks can generalize their recognition capabilities, the neural network will distinguish between the entire Class A and Class B, if the training sets are sufficiently representative.

Artificial neural networks also have the ability to make decisions based on large amounts of redundant information. Nevertheless, neural networks typically perform optimally if the input information has been preprocessed in a way so as to enhance the distinctive features of the data.

SUMMARY OF THE INVENTION

Briefly, there is provided an apparatus for detecting sonar signals embedded in noise includes a neural network trained to detect signals in response to the slope of amplitude rank ordered noise corrected powers. A detector detects an analog waveform. Means samples and digitizes the analog waveform to obtain digital samples which in turn are passed through a cosine window. The digital samples are Fourier transformed into conjugate sets of complex numbers representing amplitude and phase. One conjugate set of the complex numbers are discarded, and the remaining complex numbers ranked according to frequency. The sum of the square of the real and imaginary component of each of the remaining complex numbers in a frequency band are provided to obtain a corresponding series of representing estimated power ranked by frequency over the band. The noise contained in subbands of the band is estimated. Each estimated power is then divided by the estimated noise of the subband containing the estimated power to obtain corresponding noise corrected powers, which are ranked ordered according to amplitude. The amplitude rank ordered noise powers are provided to corresponding inputs of the neural network.

BRIEF DESCRIPTION OF THE DRAWINGS

FIG. 2 is an algorithm to estimate the running noise;

FIG. 3 is an algorithm to calculate normalized power spectrum; and

DETAILED DESCRIPTION OF THE DRAWINGS

The purpose of the invention is to detect the presence of transient events against a noisy background. It does so by forming an estimate of the power spectrum, whitening the spectrum, sorting the whitened spectrum by amplitude, and using an artificial neural network to make decisions on the sorted whitened spectrum. The invention is described in the context of one example of its broad utility, e.g. the detection of sonar events.

Figure 1:
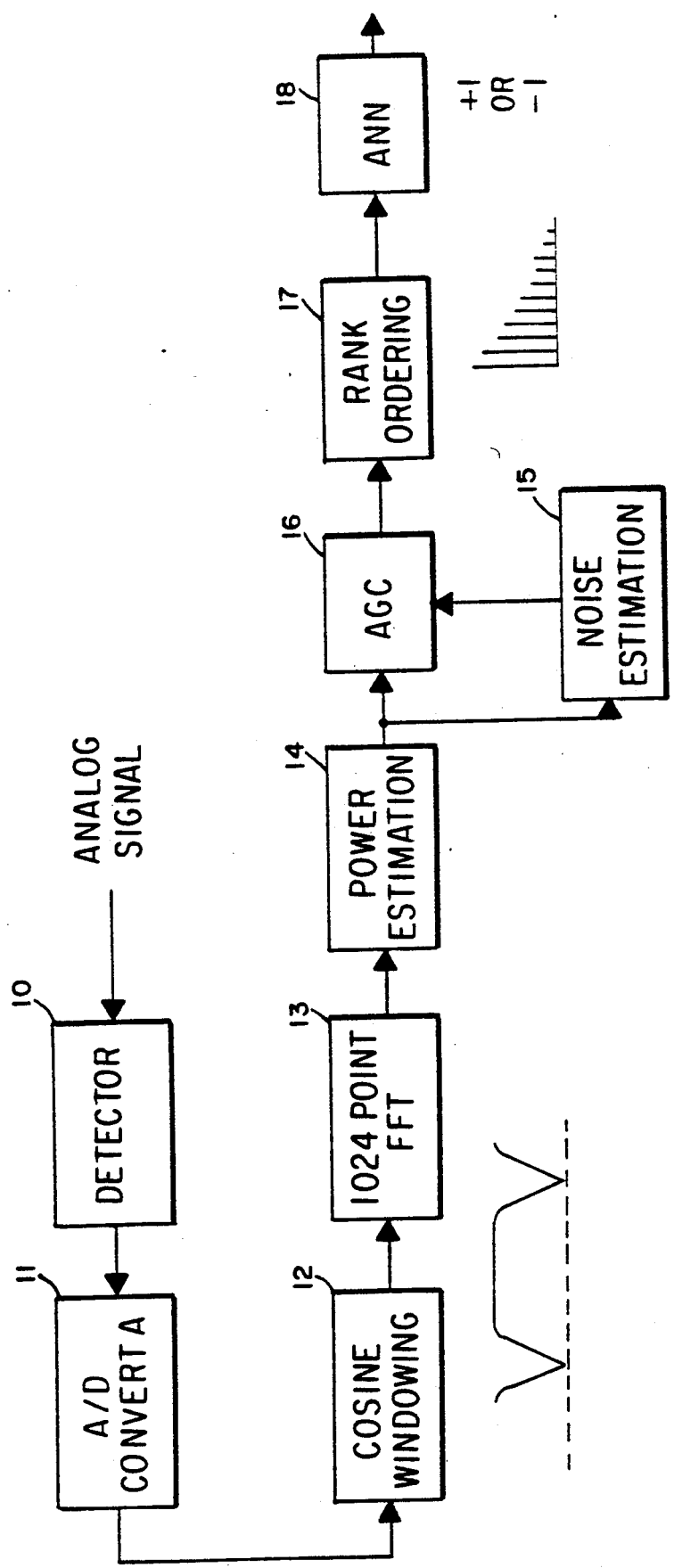
FIG. 1 shows a top level view of a preprocessor and neural network for practicing the invention.

Referring to FIG. 1, a detector 10 provides an analog sonar signal. A/D converter 11 digitizes sequential samples of a sonar signal at 40 kHz. The three processing blocks cosine windows 12, Fast Fourier Transform 13, and Power Estimator 14 are used to estimate the power spectrum of the signal at a particular time. The next two blocks, Noise Estimation 15 and Automatic Gain Control 16, are used respectively to estimate the background noise spectrum, and to normalize the power spectrum to the noise. This is a form of digital whitening, which is used here to enhance detection performance.

The digital samples cosine windowing circuit 12 with a gating time of 25.6 ms. to pass blocks of 1024 digital samples. About 80 percent of the window is flat. This procedure cuts down spectral side lobes.

The blocks of 1024 samples are transformed to the frequency domain by means of 1024 point Fast Fourier Transform (FFT) circuit 13. The samples are transformed into conjugate sets of complex numbers representing amplitude and phase ranked according to frequency. The set of complex numbers representing negative frequency is discarded, leaving 513 lines ($\frac{1}{2}$ (1024)+1).

The 513 distinct spectral estimates are spaced by 39.0625 Hz. The numbering starts at zero. Eighty-five of the 513 spectral estimates, numbered 18 (703.125 Hz) to number 102 (3984.375 Hz), span the 700 to 4000 Hz. range of interest. All other estimates are discarded to eliminate high and low frequency extremes.

Each spectral line is a complex number due to phasing. Each real or imaginary component of each spectral estimate is a linear combination of the 1024 samples used in the FFT. The power spectral estimate (power distribution over frequency) is found by the Power Estimator 14 summing the squares of the real and imaginary components of each of the 85 lines computed separately. This results in a series of estimated powers ranked by frequency over the band. The spectral power estimate is to be normalized by the noise background.

The next step is, therefore, forming an estimate of the background noise spectrum, e.g., ocean and machinery noise. FIG. 2 shows how the noise background estimate is formed using Noise Estimator 15. This is a form of digital whitening, making the expected noise power constant across subbands of the frequency band.

The average amount of noise contained in subbands of the band is estimated. The amplitudes of the noise components at each frequency have an approximately Gaussian with a Chi-square distribution having 2 degrees of freedom. With this distribution, the spread of noise expected values is quite large; 25% of all samples are more than 1.4 times the mean. If these high amplitude samples were discarded, the noise estimate would be biased downward, because of the large samples that are discarded. Lowering the fraction discarded, on the other hand, requires much higher thresholds, greatly increasing the probability of signal contamination because of noise.

The statistics of the power spectral estimates are improved by taking the average of a plurality of adjacent frequency slots. Averaging is acceptable as variation in noise level with frequency is generally smooth. Taking the average over 5 slots (spanning 195 Hz) is preferred because 5 evenly divides the 85 power spectral estimates into 17 bins. The spread is significantly less after averaging over 5 slots; only 10% of the samples are over 1.6 times the mean.

In one embodiment, a single pole low pass filter simulated by Noise Estimator 15 runs continuously to integrate the power spectral estimates. Let $P_k(i)$ be the power spectral estimate in bin 1 from the FFT for time block k in the frequency slot i, $0 \leq i \leq 84$. Let $\hat{P}_k(j)$ be the averaged power spectral estimate over 5 adjacent bins, defined by $$\hat{P}_k(j) = 1/5 \sum_{i=5j}^{5j+4} P_k(i) \; 0 \leq j \leq 16.$$

Let $E_{k-1}(j)$ be the noise estimate for the previous time block. Then, the updated estimate is given by $$E_k(j) = E_k(j-1) + a(\hat{P}_k(j) - E_{k-1}(j))$$

This is repeated for each frequency slot j, and for each time block k. The parameter $\alpha$ determines the bandwidth of the integrating filter. Since these are very close to 39 samples per second, $\alpha = 1/40$ this ensures integration over approximately one second. If the current data, containing both signals of interest and noise only, is preceded with at least two seconds of noise only, the filter should be near steady state at the times of interest.

The form given for the equation of $E_k(j)$ is preferred for two reasons. First, it is more efficient than alternative forms, since it requires only a single multiply. Second, because $\alpha$ is small, it ensures that the update to the estimate is a small correction; this reduces the accumulation of rounding errors in the estimation process.

If the current block has a signal of interest, some of the power spectral estimates $\hat{P}_k(j)$ will be well above the background noise level. Ideally, signal levels should not contribute the noise estimate $E_k(j)$ However, it has been shown above that even in noise-only environments with perfect estimates, a threshold of $\hat{P}_k(j)$ greater than 1.6 $E_{k-1}(j)$ is exceeded 10% of the time. Therefore, high values should not be discarded.

This is because the initial estimate $E_0(j)$ can, by chance, be quite low for one or more values of j. In this case, it is very improbable that $\hat{P}_1(j)$ will be small enough to change its value. Thus, the estimate $E_k(j)$ stays nearly constant at its low value. When this low value is used to normalize the power spectral estimates, it artificially enhances the corresponding frequencies. This introduces spurious peaks in the observed noise spectrum, and distorts the spectrum of events of interest.

A dual approach is used to overcome this problem. First, start values are improved by averaging over time:

$$E_9(j) = 1/10 \sum_{k=0}^{9} \hat{P}_k(j) \; 0 \leq j \leq 16$$

Second, when the threshold of 1.6 times the mean is exceeded, the noise estimate is continued to be updated, but with a smaller value, $1/10\alpha$. This reduces the distortion due to signals of interest, but also allows the averaging filter to make upward corrections. In practice, the value of $E_k(j)$ is written over the previous value $E_{k-1}(j)$, since only the former is needed for subsequent normalization.

FIG. 2 summarizes the background noise estimation algorithm. The last noise estimation $\hat{P}_k(j)$ is factored into the average approximation of last second of noise with a first time weighing factor, e.g. 1/40. If $\hat{P}_k(j)$ exceeds a threshold, e.g., 1.6 times the mean, a second time weighing factor smaller than the first weighing factor, e.g. 1/400, is used.

Once a current estimate $E_k(j)$ of the background noise power has been calculated, the spectral power estimates are normalized by the automatic gain control 16 (AGC). The normalization is chosen so that if noise only were present, the expected value of the power would be 2. (The scale factor is chosen to be consistent with Chi-square statistical models of the noise, and has no effect on performance.) Because the expected noise power is constant across the frequency subband, this step is a form of digital whitening.

FIG. 3 shows the preferred algorithm for computing the normalized spectral power estimates $p_k(j)$ Power of each of the 85 lines is normalized by dividing each estimated power by the estimated noise of the subband containing the estimated power to obtain corresponding noise corrected powers.

The next block, Rank Ordering 17, sorts the normalized power spectral estimates $p_k(i)$ in magnitude from largest to smallest, $p_k(0) \geq p_k(1) \geq \ldots \geq p_k(84) \geq 0$. For each cosine window there is a corresponding rank ordering. This amplitude rank ordering operation intentionally discards some of the information, such as the frequency of spectral components, and retains only that portion which indicates the prevalence of spectral bins with signal energy. This restricted information, the amplitude rank ordered noise powers, is sent to the corresponding inputs of a trained artificial neural network 18.

Figure 4:
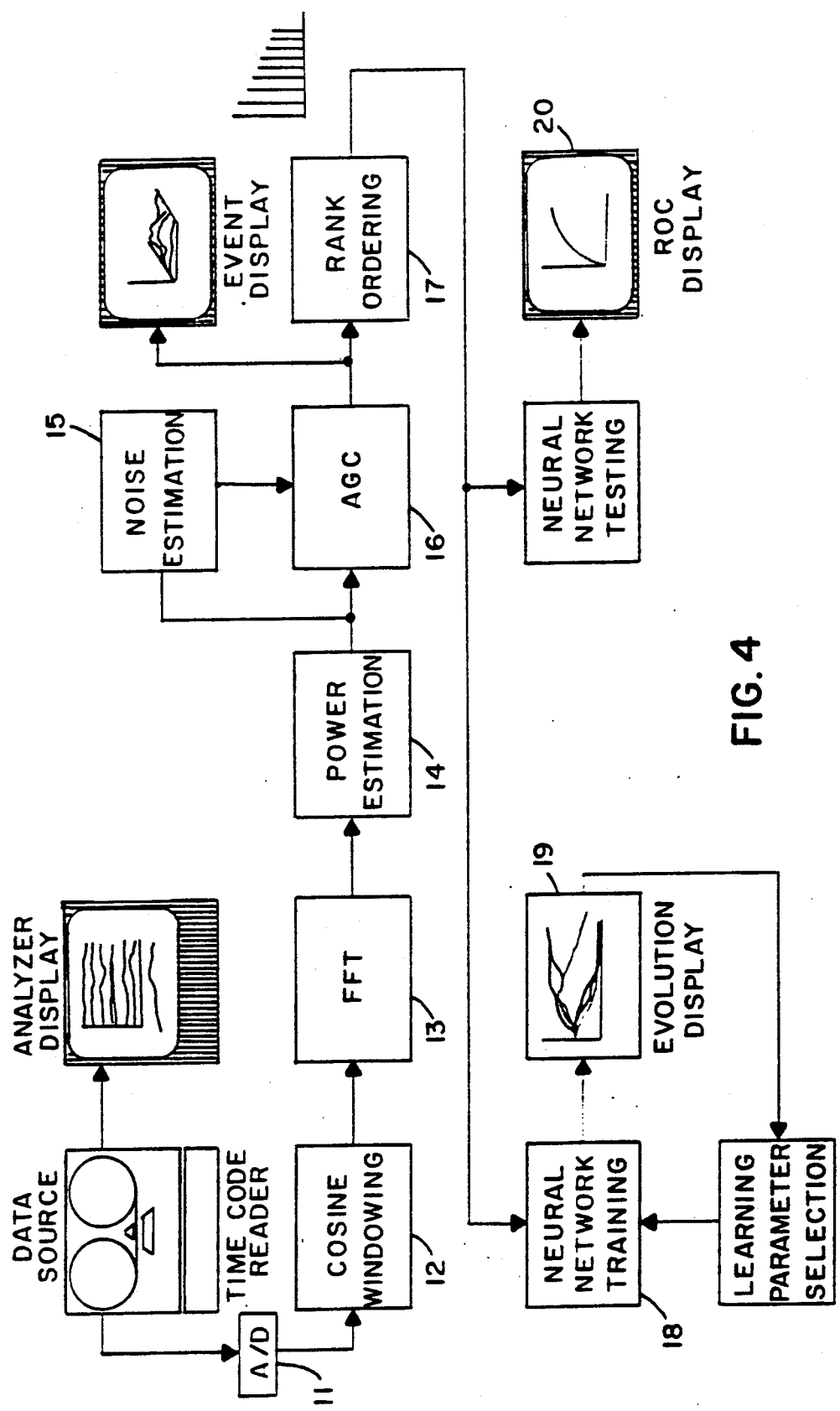
FIG. 4 shows an arrangement to train the neural network.

A suitable trained neural network is described U.S. Pat. No. 4,914,603 for TRAINING NEURAL NETWORKS, issued Apr. 3, 1990 by Laurence F. Wood. The neural network is trained, as seen in FIG. 4, to recognize transient events and reject background noise by the slope and height of the amplitude rank ordered noise corrected powers. The slope and height of the envelope of the rank ordered points will vary upon type of signal event detected. Without signal, the rank ordering would be flat and have a low amplitude, flat spectral density. After training on given sets of data, the neural network output, as seen on Evolution Display 19 evolves to be a single number, near +1 when an event of interest is recognized and near −1 when only background noise is identified. The selection of a particular decision threshold for this variable will determine the probability of false alarms (background noise identified as a signal of interest) and the probability of missed identification (a signal of interest identified as background noise), as seen on ROC (Receiver Operating Characteristics) display 20.

The preferred embodiment and best mode of practicing the invention have been described. Various modifications will now be apparent to those skilled in the art in view of these teachings. Accordingly, the scope of our invention should be determined by the following claim, and not limited by the specific examples given.

What is claimed is:

1. Apparatus for detecting sonar signals embedded in noise comprising:

a neural network trained to detect sonar signals in response to the slope of amplitude rank ordered noise corrected powers;

a detector for detecting an analog waveform;

means for sampling and digitizing said analog waveform to obtain digital samples;

means for cosine windowing said digital samples;

means for Fourier transforming said digital samples into conjugate sets complex numbers representing amplitude and phase;

means for discarding one conjugate set of said complex numbers, the remaining complex numbers ranked according to frequency;

means for providing the sum of the square of the real and imaginary component of each of said remaining complex numbers in a frequency band to obtain a corresponding series of estimated powers ranked by frequency over said band;

means for estimating the noise contained in subbands of said band;

means for dividing each estimated power by the estimated noise of the subband containing said estimated power to obtain corresponding noise corrected powers;

means for amplitude rank ordering said noise corrected powers; and means for providing said amplitude rank ordered noise corrected powers to corresponding inputs of said neural network.

* * * * *